(12) United States Patent
Evans et al.

(10) Patent No.: US 12,636,917 B2
(45) Date of Patent: May 26, 2026

(54) DEVICES, SYSTEMS AND METHODS FOR DETECTING AND LOCATING VEHICLE EVENTS, INCLUDING HAZARD EVENTS

(71) Applicant: Cypress Semiconductor Corporation, San Jose, CA (US)

(72) Inventors: Bradley Evans, Northville, MI (US); Nicholas Stopher, White Lake, MI (US)

(73) Assignee: Infineon Technologies Americas Corp., El Segundo, CA (US)

( * ) Notice: Subject to any disclaimer, the term of this patent is extended or adjusted under 35 U.S.C. 154(b) by 158 days.

(21) Appl. No.: 18/477,437

(22) Filed: Sep. 28, 2023

(65) Prior Publication Data

US 2025/0108670 A1 Apr. 3, 2025

(51) Int. Cl.
B60C 23/04 (2006.01)
G07C 5/00 (2006.01)

(52) U.S. Cl.
CPC .......... B60C 23/0479 (2013.01); G07C 5/008 (2013.01)

(58) Field of Classification Search
None
See application file for complete search history.

(56) References Cited

U.S. PATENT DOCUMENTS

| | | | | | |
|---|---|---|---|---|---|
| 5,053,588 | A | * | 10/1991 | Bolender | .............. G01P 15/135 200/61.45 M |
| 9,047,778 | B1 | * | 6/2015 | Cazanas | ................. G08G 1/161 |
| 9,933,548 | B1 | * | 4/2018 | Stenneth | ................. G01W 1/10 |
| 2013/0332004 | A1 | * | 12/2013 | Gompert | ................. G06F 16/73 701/1 |
| 2015/0015418 | A1 | * | 1/2015 | Stanek | .............. G08G 1/09626 340/901 |
| 2022/0284713 | A1 | * | 9/2022 | Rishi | ....................... G06F 18/22 |

* cited by examiner

*Primary Examiner* — Thomas S McCormack

(57) ABSTRACT

A method can include wirelessly receiving sensor data from at least one vehicle system. By operation of vehicle processing circuits, a vehicle hazard event can be detected using at least the sensor data. In response to detecting the vehicle hazard event, event data for identifying the vehicle hazard event can be generated, time data for the detected vehicle hazard event can be determined, and geographic location data for the detected vehicle hazard event can be determined. By operation of vehicle wireless circuits, an event report can be wirelessly transmitted that includes event data and the geographic location data. Corresponding devices and systems are also disclosed.

17 Claims, 11 Drawing Sheets

202

204

BT Tire
Sensors
204-0

Pressure
238-0

Accel.
238-1

IVI
230-3

GPS
Circuits
210

Lidar
204-1

Object
238-2

Radar
204-2

ADAS
System
230-0

Image
238-3

TPMS
Node
208

Location
240

Camera
204-3

Ultrasound
204-4

Suspension
Sensor(s)
204-5

Travel
238-4

Signal
Fabric (e.g., CAN-type
bus, local
wireless)

232

Processing
Circuits
206

Event
Determination
234

Event data
Upload
236

Brake
238-5

ω
238-6

Other
Sensor(s)

204-6

ABS
230-1

Time
242

Speed
238-7

TCU    230-4

Cellular
Circuits
214-0

Wi-Fi
Circuits
214-1

ECU
230-2

Temp
238-8

Reporting Packet
224

444-0

402

System Power →

Local Battery ⇢

Power Supply Management
448

446

Other
Sensor Data →

IF
450

Calibration ←

Processing Circuits 406

| Sensor Calibration 452 |
| Sensor Reading 454 |

Event Determine 434

| Arithmetic/Logic 434-0 |
| Machine Learned 434-1 |

BT
Tx/Rx

408

← Tire Sensor Data

← Other Sensor Data

→ Calibration

Wi-Fi
Tx/Rx

456

← Other Sensor Data

⇢ Event Report

→ Calibration

Memory Circuits 412

| Firmware 458 |

System Data 460-0

| Sensor Calibration 462 | Sensor Thresholds 464 |

Event Data 460-1

| Sensor Type/ID 462 | Sensor Reading 464 |
| Timestamp 442 | Location 440 |

Cellular

414

→ Event Report
424

Event ID,
Location,
Time

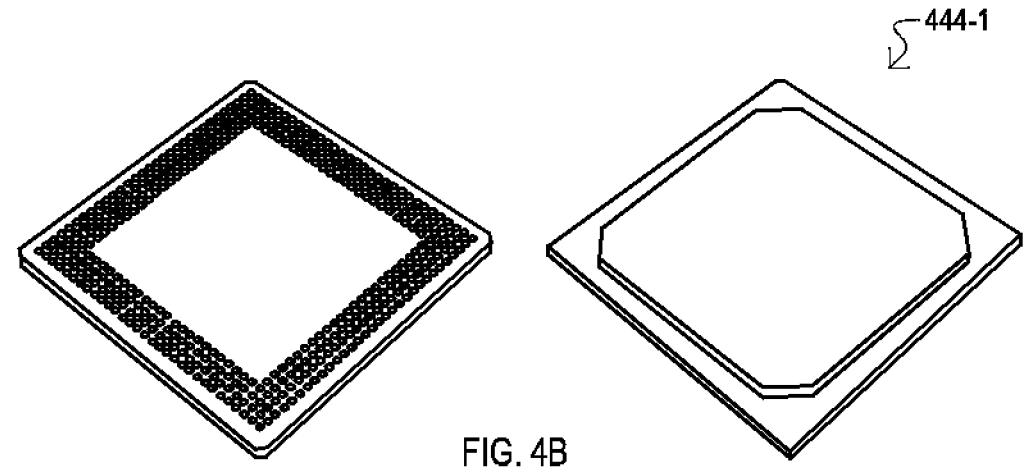

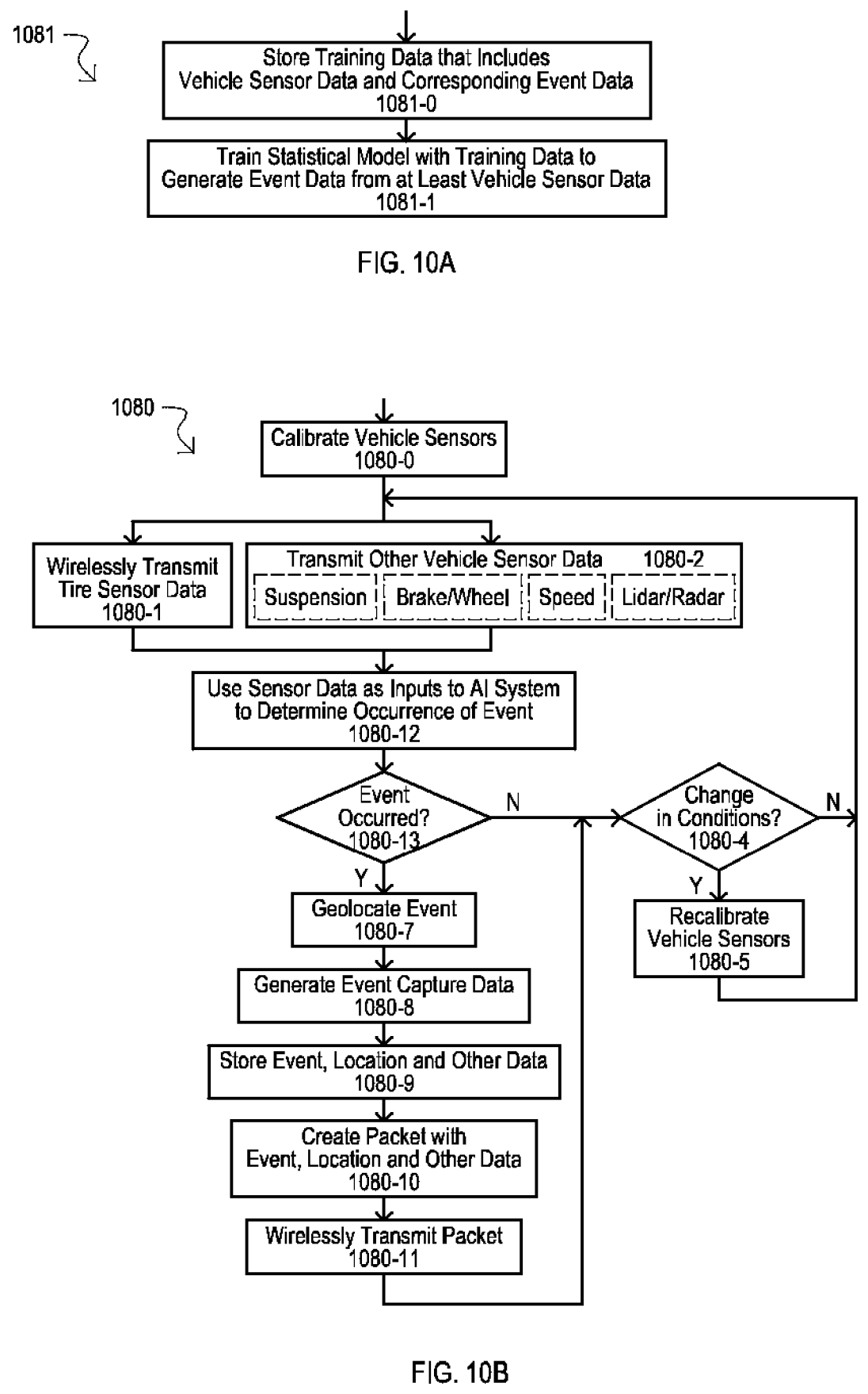

┌─────────────────────────────────────────────┐
│ Store Training Data that Includes           │
│ Vehicle Sensor Data and Corresponding Event Data │
│ 1081-0                                       │
└─────────────────────────────────────────────┘

┌─────────────────────────────────────────────┐
│ Train Statistical Model with Training Data to │
│ Generate Event Data from at Least Vehicle Sensor Data │
│ 1081-1                                       │
└─────────────────────────────────────────────┘

┌──────────────────────┐
│ Calibrate Vehicle Sensors │
│ 1080-0               │
└──────────────────────┘

┌──────────────────────┐   ┌────────────────────────────────────────────────┐
│ Wirelessly Transmit  │   │ Transmit Other Vehicle Sensor Data   1080-2   │
│ Tire Sensor Data     │   │ ┌──────────┐ ┌───────────┐ ┌──────┐ ┌────────────┐ │
│ 1080-1               │   │ │Suspension│ │Brake/Wheel│ │Speed │ │Lidar/Radar │ │
└──────────────────────┘   │ └──────────┘ └───────────┘ └──────┘ └────────────┘ │
                           └────────────────────────────────────────────────┘

┌──────────────────────────────────────┐
│ Use Sensor Data as Inputs to AI System │
│ to Determine Occurrence of Event       │
│ 1080-12                               │
└──────────────────────────────────────┘

Event Occurred? 1080-13 ──N──► Change in Conditions? 1080-4 ──N──►

Y

┌──────────────────────┐
│ Geolocate Event      │
│ 1080-7               │
└──────────────────────┘

Change in Conditions? — Y ─►
┌──────────────────────┐
│ Recalibrate          │
│ Vehicle Sensors      │
│ 1080-5               │
└──────────────────────┘

┌──────────────────────┐
│ Generate Event Capture Data │
│ 1080-8               │
└──────────────────────┘

┌──────────────────────────────┐
│ Store Event, Location and Other Data │
│ 1080-9                       │
└──────────────────────────────┘

┌──────────────────────────────┐
│ Create Packet with           │
│ Event, Location and Other Data │
│ 1080-10                      │
└──────────────────────────────┘

┌──────────────────────┐
│ Wirelessly Transmit Packet │
│ 1080-11              │
└──────────────────────┘

FIG. 10B

DEVICES, SYSTEMS AND METHODS FOR DETECTING AND LOCATING VEHICLE EVENTS, INCLUDING HAZARD EVENTS

TECHNICAL FIELD

The present disclosure relates generally to vehicle systems, and more particularly to vehicle systems for detecting and locating vehicle events, such as road hazards, and providing such data to other systems, such as routing and/or mapping systems.

BACKGROUND

Conventional vehicles, as well as user devices such as smartphones, can include vehicle mapping services. Mapping services can be deployed on remote computing systems to provide location information and other features such as route calculation and searches for local services (e.g., restaurants, business, fuel locations, etc.).

Some mapping services can access road alert services that provide alerts for geographic regions. Road alert services can use reports from public and private institutions, such as law enforcement, emergency services (e.g., firefighters/ paramedics, ambulance) and towing companies to locate and identify road events. In addition, some road alert services can use reports called in by trusted individuals.

SUMMARY OF DISCLOSURE

Embodiments can include sensors of a vehicle generating and wirelessly transmitting sensor data for a vehicle state. Processing circuits of the vehicle can use such sensor data to determine if a road event has occurred. A road event can indicate an event or condition that can adversely affect a vehicle, including but not limited to a hazardous condition. In response to detecting a road event, the processing circuits can generate data identifying the event and determine a time and location for the event. Wireless circuits of the vehicle can transmit an event report that can include data indicating the type of event, time of the event and location of the event.

In some embodiments, event reports can be used to generate a road event data map which can be relayed to other vehicles in the same area.

BRIEF DESCRIPTION OF THE DRAWINGS

FIGS. 4A and 4B are diagrams of vehicle systems that include controller devices according to embodiments.

FIGS. 10A and 10B are flow diagrams methods that can detect vehicle events with machine learning according to embodiments.

DETAILED DESCRIPTION

According to embodiments, vehicle systems can receive data from on-board sensors, including wireless sensors, and process such data to determine if a vehicle event (e.g., a hazard event or condition) has occurred. In response to determining the occurrence of a vehicle event, the vehicle can automatically generate an event report that can identify the type of event, and provide an event location and event time. The event report can be uploaded to a remote system, such as an alert system, via one or more wireless networks.

In some embodiments, wireless tire sensors can relay tire data, such as pressure and/or tire acceleration. Such tire data can be used to detect events that cause flat tires, rough road conditions (e.g., potholes) and low traction events (e.g., icy road, hydroplaning conditions).

In some embodiments, data from wireless sensors can be combined with other sensors to determine a vehicle event. Other sensors can report states of any other suitable vehicle system, including but not limited to a suspension system, brake system, drive system or power system.

In some embodiments, upon determining a vehicle event, other sensors can be activated, such as cameras, radars, ultrasound, lasers, to gather additional data related to the event. Such additional data can be included in an event report.

Determining a vehicle event can include any suitable vehicle processing circuits, including the execution of algorithms that compare sensor readings to limits, as well as the use of statistical models created with machine learning to determine the occurrence of a road event in response to vehicle sensor data.

In some embodiments, vehicle event reports automatically generated by different vehicles can be aggregated or otherwise processed to generate location data mapping to inform other vehicles of potential hazards/hazardous conditions.

Figure 1:
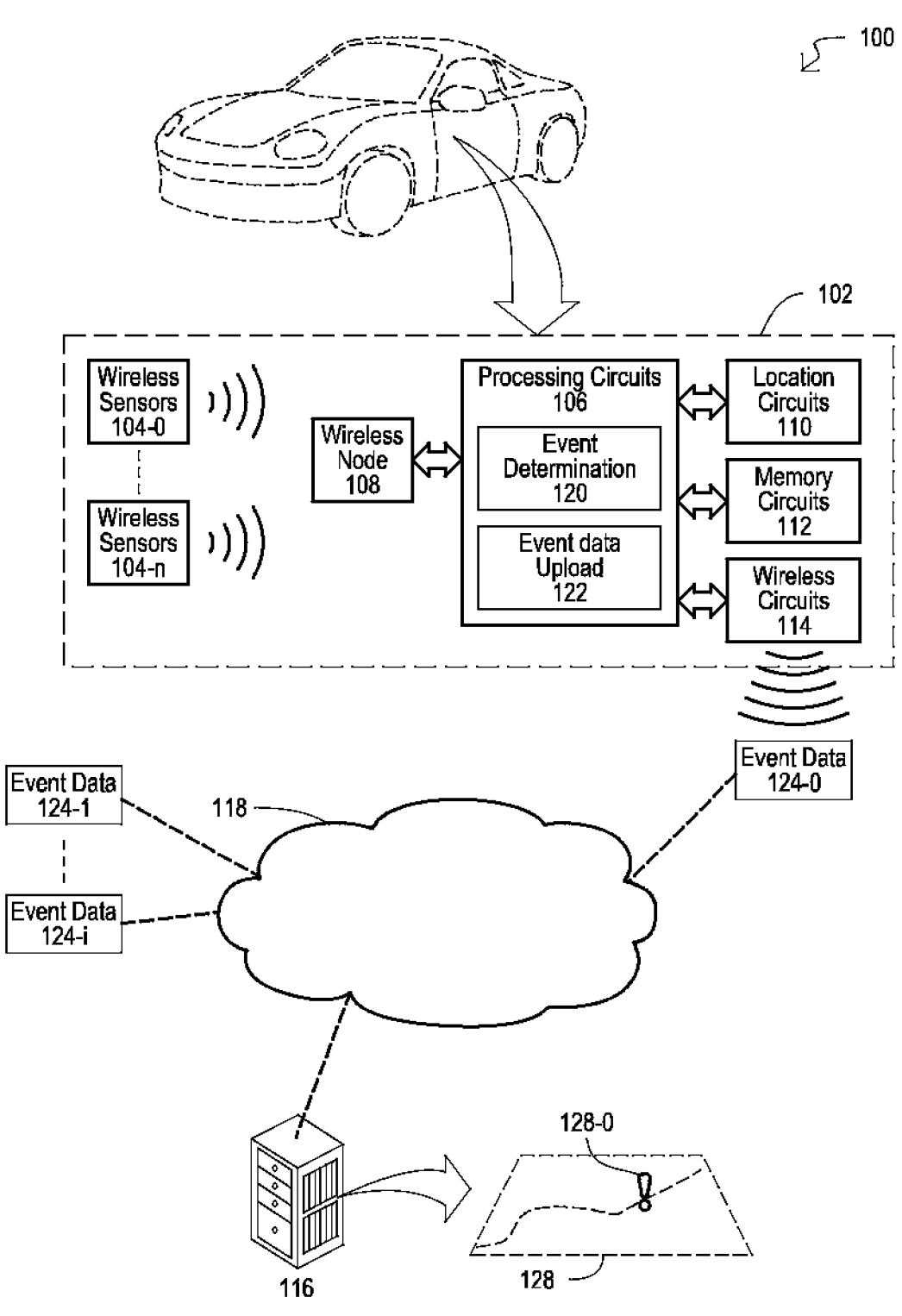
FIG. 1 is a diagram showing a system for automatically reporting vehicle event data according to an embodiment.

FIG. 1 shows a system 100 according to an embodiment. A system 100 can include a vehicle system 102, communications network 118, and a remote computing system 116. A vehicle system 102 can monitor vehicle sensor data to determine the occurrence of a vehicle event, and in response, automatically transmit event data 124-0 over a communications network 118 to a remote computing system 116. A remote computing system 116 can receive event data from other vehicles 124-1 to 124-I, and generate location (e.g., mapping) data 128 that can identify events/conditions 128-0 using received event data (124-0 to 124-$i$).

A vehicle system 102 can include wireless sensors 104-0 to 104-$n$, processing circuits 106, a wireless node 108, location circuits 110, memory circuits 112 and wireless circuits 114. Wireless sensors (104-0 to -n) can sense a state of a vehicle, and wirelessly transmit such state data for reception by a wireless node 108. Wireless sensors (104-0 to -n) can generate sensor data for any suitable vehicle system, including but not limited to, tires, suspension, braking, drivetrain, drive motors, and operating environment sensors (e.g., radars, lidar, camera, ultrasound, temperature). Wireless sensors (104-0 to -n) can transmit data according to any suitable protocol/standard, and in some embodiment can utilize a relatively low-power, short range standard. In some embodiments, wireless sensors (104-0 to -n) can be compatible with one or more Bluetooth (BT) standards (including BLE), one or more Zigbee standards and/or one or more IEEE 802.11 wireless standards and related standards (e.g., Wi-Fi Direct), such as those operating in the 2.4 GHZ, 5 GHZ or 6 GHz bands, referred to herein collectively as Wi-Fi.

A wireless node 108 can receive data from wireless sensors (104-0 to -n), and provide such sensor data to processing circuits 106. In some embodiments, wireless node 108 can transmit data to wireless sensors (104-0 to -n), including configuration and/or calibration data.

Processing circuits 106 can be configured as event determination circuits 120 and event data upload circuits 122. Event determination circuits 120 can process data from wireless sensors (104-0 to -n), and optionally, other sensor data, to detect the occurrence of a vehicle event. A vehicle event can include events that affect the travel or state of a vehicle, and can include hazard events. Event determination circuits 120 can include any suitable operations, including comparing sensor readings to established limits, as well as statistical models established with machine learning operations. Event data upload circuits 122 can compile event data for transmission from the vehicle system 102.

Location circuits 110 can include any circuits suitable for providing a geographic location to associate with (e.g., tag) a detected event. Location circuits 110 can include, but are not limited to, geolocation circuits, such as circuits that use global position system (GPS) signals, cellular network locating signals, or location services that rely on other standards or services, including private wireless networks.

Memory circuits 112 can store data for a vehicle system 102, and in some embodiments can include code executable by one or more processors of processing circuits 106. Memory circuits 112 can also store data related to wireless sensors (104-0 to -n), including but not limited to, sensor reading data received from wireless sensors (104-0 to -n), configuration/calibration for wireless sensors (104-0 to -n), as well as event data 124 for transmission from a vehicle system 102.

Wireless circuits 114 can include any circuits suitable for connecting to a communications network 118 to enable the transmission of event data 124 to a remote computing system 116. Wireless circuits 114 can include circuits operating according to any suitable standard, including but not limited to a cellular network standard and/or a Wi-Fi standard.

A communications network 118 can enable event data (124-0 to -i) to be transmitted to remote computing system 116. A network system 118 can include any suitable network, including a cellular network, the internet, a WLAN, a WAN, LAN, private network, or combinations thereof.

A remote computing system 116 can include one or more server systems running one or more applications that can process event data (124-0 to -i). Such an application can locate the presence of road events and/or conditions 128-0 in a geographic area 128. In some embodiments, such events/ conditions 128-0 can be added to route maps or the like. In addition or alternatively, a remote computing system 116 can execute one or more applications that can perform any of, accumulate event data, organize event data, process event data and/or present event data to a user or other system via a download map or otherwise.

In this way, a vehicle system can monitor sensors, including wireless sensors, to automatically detect a road event or condition, and wirelessly transmit data related to the event to a remote computing system. A remote computing system can aggregate event data to identify road events/conditions in a geographic area.

Figure 2:
FIG. 2 is a block schematic diagram of a vehicle system for determining and reporting the occurrence of vehicle events according to an embodiment.

FIG. 2 is a block schematic diagram of a vehicle system 202 according to an embodiment. A vehicle system 202 can include sensors 204, processing circuits 206, a wireless node 208, communication fabric 232 and various other systems 230-0 to 230-4. Sensors 204 can include BT tire sensors 204-0, lidar 204-1, radar (both short and long range) 204-2, one or more cameras 204-3, ultrasound sensors 204-4, suspension sensors 204-5 and any other suitable sensors 204-6. BT tire sensors 204-0 can wirelessly transmit pressure data 238-0, and optionally acceleration data 238-1, to a central BT node 208, which can be a tire pressure monitoring system (TPMS) node. Central BT node 208 can provide data from BT tire sensors 204-0 to processing circuits 206 for use in an event determination operation 234.

In the embodiment shown, lidar 204-1, radar 204-2, cameras 204-3, and ultrasound sensors 204-4 can be connected to, or integrated with, an advanced driver-assistance system (ADAS) 230-0. Such sensors (204-1 to 204-4) can have wired and/or wireless connections to ADAS 230-0. Optionally, object data 238-2 and/or image data 238-3 generated by any of sensors (204-1 to -4) can be provided to processing circuits 206 via ADAS 230-0 or an alternate signal path. In the embodiment shown, optionally, one or more suspension sensors 204-5 can provide vehicle state data, such as travel data 238-4 to processing circuits 206.

An anti-lock brake system (ABS) 230-1 and electronic control unit (ECU) 230-2 can receive data from other sensors 204-6. Optionally, ABS 230-1 can provide braking data 238-5 and/or wheel rotation data (w) 238-6 to processing circuits 206. An ECU 230-2 can provide time data 242, and optionally, speed data 238-7 and/or temperature data 238-8 to processing circuits 206.

Data from any of sensors (204-0 to -6) and/or systems (230-0 to -2) can be provided to processing circuits via a vehicle signal fabric 232. A signal fabric 232 can include any suitable data transmission systems of a vehicle, including but not limited to wireless systems (e.g., BT, Wi-Fi, Zigbee) and/or wired systems (e.g., CAN-type bus, media oriented systems transport (MOST), Flexray or Automotive Ethernet).

GPS circuits 210 can provide location data 240 to processing circuits 206 to enable the geolocation of any detected vehicle events. In the embodiment shown, GPS circuits 210 can be part of an in-vehicle infotainment system (IVI) 230-3.

Processing circuits 206 can receive tire pressure data 238-0, location data 240, time data 242, and optionally, any of the other sensor data (238-1 to 238-7), and in response, execute an event determination operation 234 as described herein or equivalents. An event determination operation 234 can determine the occurrence of a vehicle event, and in some embodiments, determine the type of vehicle event that has occurred. Upon determining the occurrence of an event, processing circuits 206 can execute an event data upload operation 236, which can include composing reporting data for an event. Such reporting data can include, a type of event, location of event, time of the event, and optionally, any other sensor data, or values generated by processing such data with processing circuits 206. An event data upload operation 236 can also include controlling wireless circuits to transmit a reporting packet 224 containing the reporting data for the event.

In some embodiments, an event data upload operation 236 can include accessing additional sensor data for inclusion in a reporting packet 224 that is not used in an event determination operation 234. As but one of many possible examples, camera data can be accessed in response to detecting an event. The timing of such additional sensor data may or may not correspond to that of a detected event. In one embodiment, tire pressure data 238-0 can be used in an event determination operation 234 to determine a tire hazard (flat). A corresponding event data upload 236 can access image data 238-3. However, such image data 238-3 can be earlier in time than the detected event (front camera) or later in time (rear camera). Various other combinations of additional sensor data for inclusion in a report would be obvious to those skilled in the art.

In the embodiment shown, a reporting packet 224 can be transmitted by cellular circuits 214-0. Cellular circuits 214-0 can be part of a telematics control unit (TCU) 230-4, which may also include Wi-Fi circuits 234-1, which may also transmit a reporting packet 224.

In this way a vehicle system can utilize tire state data from wireless tire sensors, as well as other vehicle sensor data, to determine the occurrence of a vehicle event, as well as a time and location of the event. The vehicle event can then be reported in a packet transmitted with wireless circuits of the vehicle.

Figure 3:
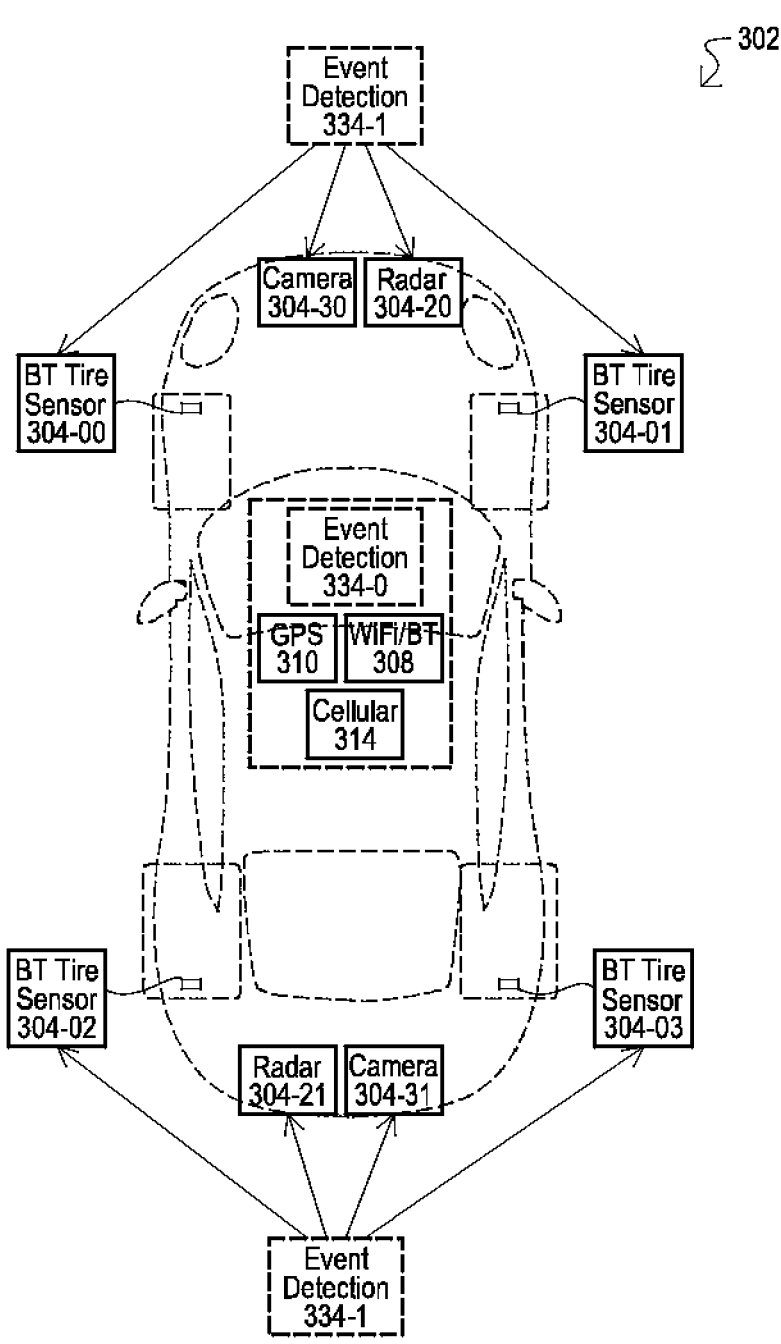
FIG. 3 is a diagram of a vehicle system for detecting vehicle events using wireless tire sensors according to embodiments.

FIG. 3 is diagram of vehicle systems 302 according to another embodiment. A vehicle system 302 can include BT tire sensors 304-00 to 304-03, radar sensors 304-20/21, cameras 304-30/31, event detection circuits 334-0/1, GPS circuits 310, combination wireless circuits 308, and cellular circuits 314. BT tire sensors (304-00 to -03) can sense tire state data, and transmit such data for reception by any of event detection circuits 334-0/1.

Radar sensors 304-20/21 and cameras 304-30/31 can provide sensor data as described herein and equivalents, including transmitting such sensor data to event detection circuits 334-0/1 and/or as supplementary data in an event report. GPS circuits 310 can provide location data for inclusion in an event report, as described herein, and equivalents. Combination wireless circuits 308 can enable communications according to more than one standard, and in the embodiment shown, can provide BT communications and Wi-Fi communications. In some embodiments, BT circuits in combination wireless circuits 308 can serve as a master BT node. In some embodiments, Wi-Fi circuits within combination wireless circuits 308 can transmit event data and/or receive sensor data from vehicle sensors transmitting sensor data according to a Wi-Fi standard. Cellular circuits 314 can transmit event data to a cellular network, as described herein and equivalents.

Referring still to FIG. 3, event detection circuits can include central event detection circuits 334-0 and/or peripheral event detection circuits 334-1. Central event detection circuits 334-0 can be located remote from BT tire sensors (304-00 to -03) and other sensors (e.g., 304-20/21, 304-30/31), and can execute event determination based on data from such remote sensors. However, in some embodiments, all or a portion of event detection can occur at peripheral event detection circuits 334-1. Any of remote sensors (304-00 to -03, -20/21, -30/31) can include processing circuits serving as peripheral event detection circuits 334-1. As but a few of many possible examples, BT tire sensors (304-00 to -03) include peripheral event detection circuits 334-1 that can detect the occurrence of a vehicle event associated with tires, such as flat, leak, or traction condition (ice, wet conditions). Still further, any of peripheral event detection circuits 334-1 can receive sensor data from other sensors, and execute event detection using such sensor data. In some embodiments, event detection operations can be dynamically moved to different event detection circuits (334-0/1) and/or distributed across more than one event detection circuit (334-0/1).

In this way, an automobile system can automatically determine the occurrence of vehicle event with peripheral processing circuits, such as those deployed in sensors, and/or distribute such operations over processing circuits at different locations in the vehicle system.

FIG. 4A is a block schematic diagram of an automobile system 402 according to another embodiment. A system 402 can include a controller device 444-0, communication device 446, and cellular circuits 414. In some embodiments, a controller device 444-0 can be a unitary integrated circuit device, including but not limited to a microcontroller, microprocessor or system-on-chip (SoC), including a programmable SoC. A controller device 444-0 can include power supply management circuits 448, processing circuits 406, memory circuits 412 and wired interface circuit 450. Processing circuits 406 can take any suitable form, as described herein and equivalents. Processing circuits 406 can execute sensor calibration operations 452, sensor reading operations 454 and event determination operations 434.

Sensor calibration operations 452 executed by processing circuits 406 can include generating and transmitting configuration data to sensors, which can include any sensors described herein and equivalents. Such calibration data can be transmitted to sensors in any suitable fashion, including but not limited to, over wired interface circuits 450, communication device 446, or both. Sensor calibration operations 452 can include an initial calibration for sensors, followed by re-calibration operations. Re-calibration operations can occur in response to any suitable condition, including changes to vehicle components or vehicle configuration and/or changes in operating environment (e.g., temperature, humidity, vehicle speed). In addition or alternatively, sensor calibration operations 453 can include adjusting the processing of received (e.g., raw) sensor data to account for environmental or other conditions affecting sensor operation.

A sensor reading operation 454 executed by processing circuits 406 can include active operations, in which processing circuits 406 can issue a request message to sensors, and sensors can respond by transmitting sensor data. In addition or alternatively, sensor reading operations 454 can also include passive operations, in which processing circuits 406 can receive periodic data from sensors and/or periodically read registers or the like where sensor data has been stored. Sensor data can be received in any suitable fashion, including vias wired interface circuits 450, communication device 446, or both.

An event determination operation 434 executed by processing circuits 406 can take the form of any of those described herein and equivalents. An event determination operation 434 can include non-learned arithmetic/logic operations 434-0, including but not limited to, comparing sensor readings to predetermined limits. In addition or alternatively, an event determination operation 434 can be a machine learned operation 434-1. A machine learned operation 434-1 can include a static statistical model created by machine learning, or a statistical model that continues to learn and/or is updated periodically.

Memory circuits 412 can store data for executing calibration and event determination operations as described herein, including but not limited to, firmware 458, system data 460-0 and event data 460-1. Firmware 458 can include code executable by one or more processors of processing circuits 406 for providing the operations described herein.

System data 460-0 can include sensor calibration data 462 and sensor threshold data 464. Sensor calibration data 462 can be used by processing circuits 406 in a sensor calibration operation 452 to calibrate sensors as described herein. Sensor thresholds 464 can be used by processing circuits 406 in an event determination operation 434 as described herein.

Event data 460-1 can include data related to a detected vehicle event, including but not limited to, sensor type/ identification (ID) data 462, sensor reading data 464, timestamp data 442 and location data 440. Sensor type/ID data 462 can identify a sensor providing data for an event determination operation 434 and/or a sensor providing data for an event report (e.g., ancillary report data). Sensor reading data 464 can include raw and/or processed sensor data used in an event determination operation 434 and/or as provided in an event report. Timestamp data 442 can be a timestamp generated by a system 402 that can identify the time of an event and/or the time sensor data was acquired. Location data 440 can be provided by other systems of a vehicle (e.g., GPS) and can identify a location of a determined event.

In some embodiments, a communication device 446 and controller device 444-0 can be a unitary integrated circuit device. A communication device 446 can include BT circuits 408 and Wi-Fi circuits 456, which can wireless communicate with other devices of a vehicle system, as well as devices separate from a vehicle system. BT circuits 408 can receive tire sensor data from BT tire sensors and well as sensor data from other sensors having BT capabilities. BT circuits 408 can transmit calibration data and/or commands to sensor devices, including BT tire sensors.

Wi-Fi circuits 456 can receive sensor data from sensors that can transmit over a Wi-Fi channel. In some embodiments, Wi-Fi circuits 456 can transmit an event report 424 to a Wi-Fi compatible network, to report a determined event to a remote computing system. Wi-Fi circuits 456 can also transmit calibration data and/or commands to Wi-Fi compatible sensor devices.

Cellular circuits 414 can transmit an event report 424 over a cellular network to a remote computing system as described herein and equivalents. An event report 424 can include an event ID (e.g., data identifying a type of vehicle event, location data and time data). However, as described herein, an event report 424 can include ancillary data accessed/acquired in response to detecting an event.

FIG. 4B includes two different views of a controller device 444-1 according to an embodiment. A controller device 444-1 can include circuits like those shown in 444-0 of FIG. 4A, and can be in the form of a single integrated circuit device. While FIG. 4B shows a packaged IC device, alternate embodiments can include a different type of packaging and/or an unpackaged die attached to systems substrate in any suitable fashion.

In this way, a vehicle system can include a controller device that calibrates sensors, receives sensor data over wireless and/or wired connections, and determines the occurrence of vehicle event.

Figure 5A:
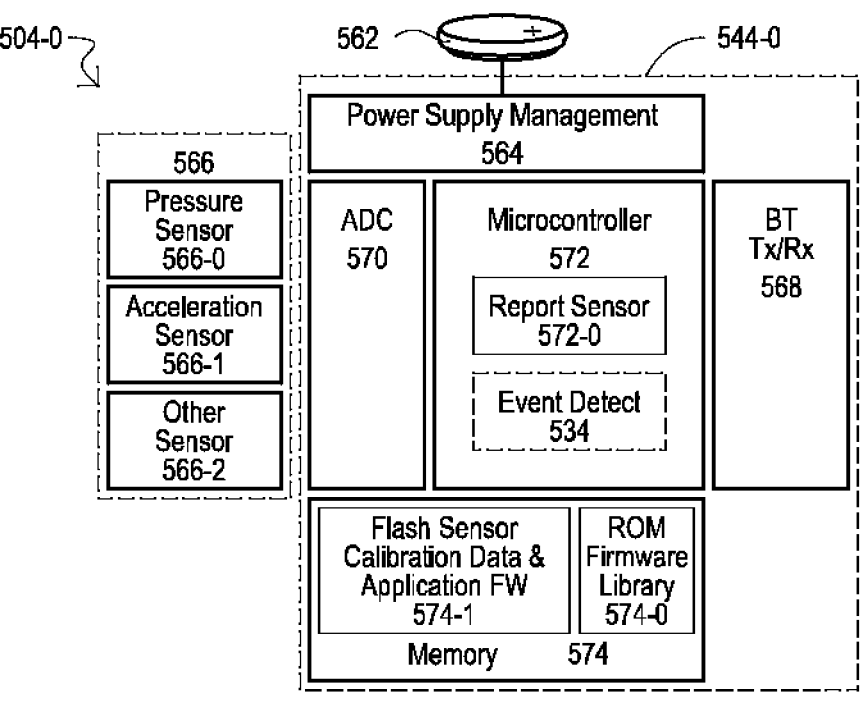
FIGS. 5A to 5C are diagrams showing wireless tire sensors according to embodiments.

FIG. 5A is a block diagram of a tire sensor 504-0 according to an embodiment. In some embodiments, a tire sensor can be compatible with a TPMS having a BT capability. A tire sensor 504-0 can include a battery 562, tire sensors 566, and a sensor circuit device 544-0. Tire sensors 566 can include any suitable sensors for detecting features of a tire, including but not limited to, a pressure sensor 566-0, acceleration sensor 566-1 and other sensors 566-2. Other sensors 566-2 can include but are not limited to temperature sensors.

A sensor circuit device 544-0 can include a power supply management circuit 564, an analog-to-digital converter circuit (ADC) 570, a microcontroller 572, BT circuits 568 and memory circuits 574. ADC 570 can convert analog signals received from tire sensors 566 into digital values, including converting tire pressure readings into digital values for transmission.

A microcontroller 572 can be programmed to execute various functions, including but not limited to reporting tire sensor data 572-0 and event detection 534. Reporting tire sensor data 572-0 can include controlling the periodic transmission of digital sensor data provided from ADC 570 or directly from a sensor 566. Event detection 534 can include all or part of an operation that determines the occurrence of a vehicle event using data from sensors 566, as described herein and equivalents.

BT circuits 568 can transmit tire sensor data, and optionally, event determination data according to any suitable BT standard. Memory circuits 574 can store data for a sensor 504-0. Such data can include, but is not limited to, firmware 574-0 for execution by microcontroller 572 to provide the various microcontroller functions described as well as sensor data and calibration data and application firmware 574-1. In some embodiments, memory circuits 574 can be nonvolatile memory circuits.

Figure 5B:
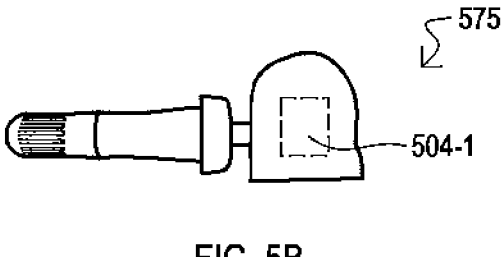

FIG. 5B is a diagram showing a tire valve stem assembly 575 according to an embodiment. A tire valve stem assembly 575 can include a tire sensor 504-1 like that shown in FIG. 5A, or an equivalent, and can be installed in a tire of a vehicle.

Figure 5C:
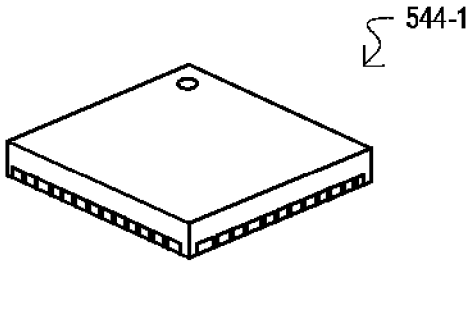

FIG. 5C is a diagram of a sensor circuit device 544-1 according to an embodiment. A sensor circuit device 544-1 can include circuits like those shown as 544-0 in FIG. 5A, and can be in the form of a single integrated circuit device. Alternate embodiments can include a different type of packaging and/or an unpackaged die attached to systems substrate in any suitable fashion.

In this way, a tire pressure sensor can include circuits for determining if a vehicle event has occurred, and wirelessly report the occurrence of the event.

Figure 6A:
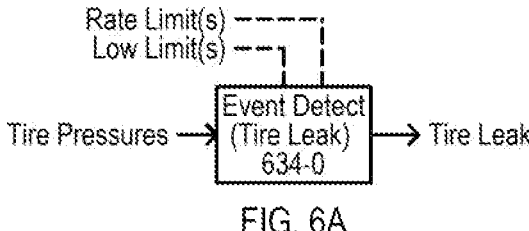
FIGS. 6A to 6D are diagrams showing various vehicle event detect operations according to embodiments.

FIGS. 6A to 6D are diagrams showing event detection operations according to embodiments. FIG. 6A shows event detection 634-0 of a tire leak event according to an embodiment. Processing circuits can receive tire pressure values, and in response, determine that a tire has a leak condition. In non-machine learned processing, event detection 634-0 can make a determination based on comparing tire pressure values to one or more limits, which can include a rate limit and/or a low pressure limit. As but one of many possible examples, a rate limit can be given by $$\text{Limit (pressure\_rate)} = \frac{2 \; PSI}{1 \; \text{second}}.$$

Figure 6B:
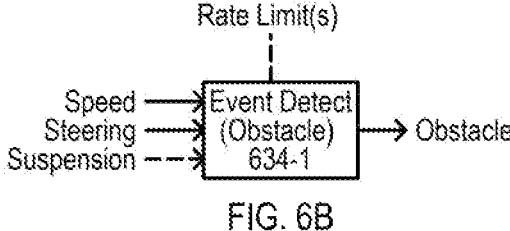

FIG. 6B shows event detection 634-1 of an obstacle event according to an embodiment. Processing circuits can receive speed and optionally, steering and/or suspension data. In response, a determination can be made that a road obstacle exists. In non-machine learned processing, event detection 634-1 can make a determination based on comparing at least speed to one or more limits. As but one of many possible examples, a rate limit can be given by $$\text{Limit (speed\_rate)} = \frac{30 \; MPH}{0, 1 \; \text{second}}.$$

Figure 6C:
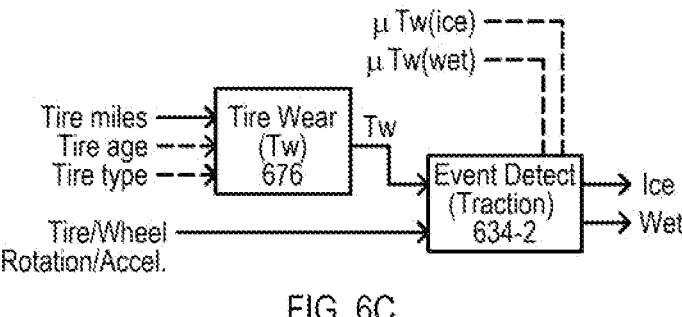

FIG. 6C shows event detection 634-2 of a traction event according to an embodiment. Processing circuits can receive a tire wear value (Tw) as well as tire and/or wheel rotation values (e.g., angular velocity and/or acceleration). In response, a determination can be made that road conditions can result in a loss of traction. In the embodiment shown, processing circuits can also execute a tire wear determination 676. A value Tw can be generated based on tire miles, and optionally, tire age and tire type data. In non-machine learned processing, event detection 634-2 can make a determination based on a determined coefficient of friction (μ) over time, where u can be a function of Tw. As but one of many possible examples, a rate limit can be given by $\mu(Tw) < 0.08$ over 0.5 second (determines ice conditions), $\mu(Tw) < 0.70$ over 0.05 second (determines wet conditions).

Figure 6D:
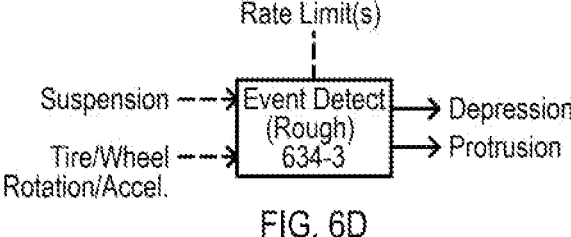

FIG. 6D shows event detection 634-3 of rough road conditions (e.g., pothole, buckle) according to an embodiment. Processing circuits can receive suspension and/or tire/wheel acceleration data. In response, a determination can be made that rough road conditions exist. Such a determination can indicate if the conditions include a depression in the road, protrusion from the road, or a combination thereof.

It is understood that the embodiments of FIG. 6A to 6D are exemplary, and should not be construed as limiting or exhaustive. One skilled in the art could arrive at the detection of the same events using different limits and/or sensors, as well as the detection of other events. Further, in machine learned processing, limits may not be included.

In this way, any of various road conditions can be detected by vehicle sensors for automatic reporting via a wireless transmission.

While embodiments can include the various methods described in conjunction with vehicle system and described herein, additional methods will now be described with reference to flow diagrams.

Figure 7:
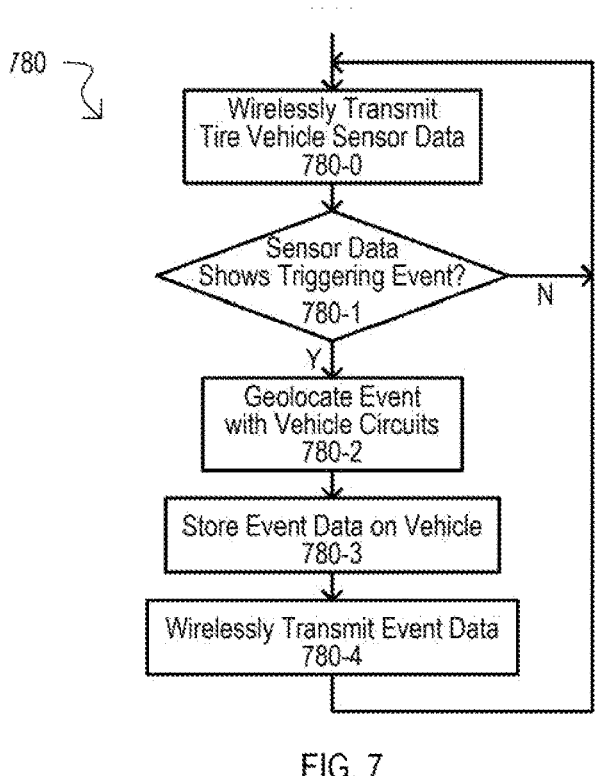
FIG. 7 is a flow diagram of method according to an embodiment.

FIG. 7 is a flow diagram of a method 780 according to an embodiment. A method 780 can include wirelessly transmitting vehicle sensor data 780-0. Such an action can include any suitable vehicle sensor transmitting vehicle state data according to one or more wireless standard. In some embodiments, such an action can include tire sensors transmitting tire state data. In some embodiments, such an action can include sensors transmitting data according to one or more BT standards.

A method 780 can include determining if sensor data shows a triggering event 780-1. In some embodiments, such an action can include processing sensor data with event detection circuits as described herein and equivalents. If a triggering event is not detected (N from 780-1), a method 780 can return to wirelessly transmitting sensor data 780-0.

If a triggering event is detected (Y from 780-1), a method 780 can geolocate the event with vehicle circuits 780-2. In some embodiments, such an action can include recording a GPS location recorded by the vehicle, or proximate to, the time of the event.

A method 780 can include storing event data on a vehicle 780-3. Such an action can include storing raw or processed data related to the event. In addition, such an action can include storing data related to the event, but not necessarily used to determine of triggering event has occurred, such as time and geolocation data. In some embodiments, storing event data can include storing event data in nonvolatile memory.

A method 780 can include wirelessly transmitting event data 780-4. Such an action can include transmitting event data from a vehicle to a communications network according to any of the embodiments described herein or equivalents. In some embodiments, such an action can include transmitting a packet over cellular network.

In some embodiments, all actions of method 780 can be performed automatically by systems of a vehicle, without user (e.g., driver or passenger) action or intervention.

In this way, a method can include using wireless sensor data to determine of a triggering event has occurred, and then geolocating the event and wirelessly transmitting event data.

Figure 8:
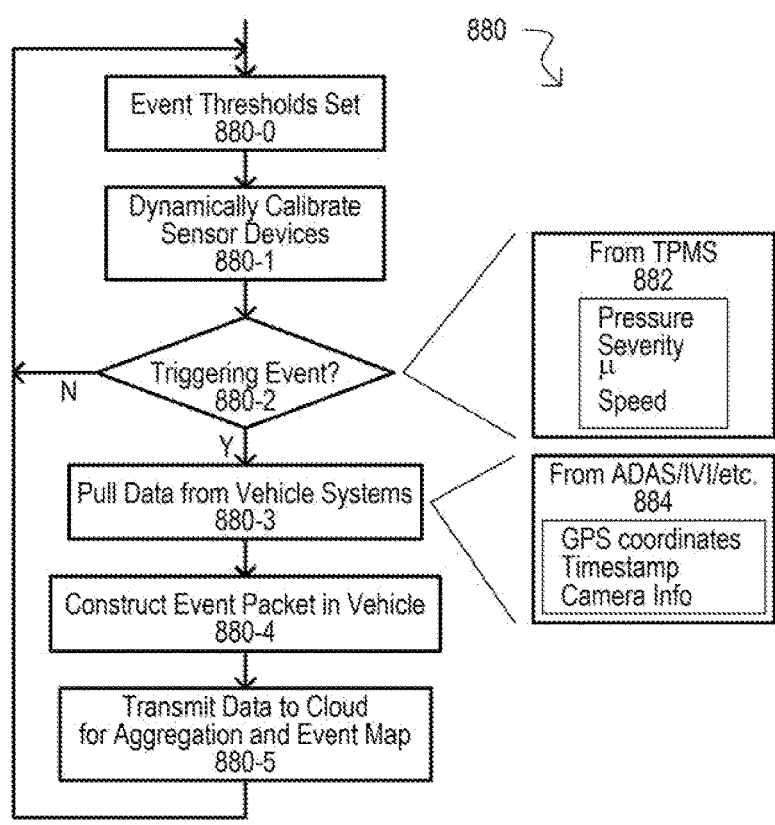
FIG. 8 is a flow diagram of method according to another embodiment.

FIG. 8 is a flow diagram of a method 880 according to another embodiment. A method 880 can include setting event thresholds 880-0. Such an action can include determining limits for sensor readings that can result in the detection of a triggering event. In some embodiments, such an action can include setting limits based on conditions sensed by a vehicle. A method 880 can dynamically calibrate sensor devices 880-1. Such an action can include establishing configuration values for sensors and/or establishing correction values for circuits that process sensor data. Such an action can also include, varying calibration values based on conditions of sensed by a vehicle.

A method 880 can determine if a triggering event has occurred 880-2. Such an action can include any of those described herein, or equivalents. In some embodiments, a triggering event can be determined from TPMS and related data 882, which can include, but is not limited to, tire pressure, severity of event (e.g., acceleration), traction (e.g., u), and/or speed. If a triggering event is not detected (N from 880-2), a method 880 can return to setting event thresholds 880-0.

If a triggering event is detected (Y from 880-2), a method 880 can pull data from vehicle systems 880-3. Such an action can include pulling data from any suitable source, including but not limited to, an ADAS and/or an IVI 884. Such data can include, but is not limited to, GPS coordinates, a timestamp and camera information.

A method 880 can construct an event packet in a vehicle 880-4. Such an action can include constructing a packet compatible with a wireless standard using on-board circuits of the vehicle. A packet can be compatible with any suitable standard, including but not limited to, a cellular network and/or Wi-Fi. A method can include transmitting data to the cloud for aggregation and an event map 880-5. Such an action can include connecting to one or more networks in communication with a remote computing system. Such a remote computing system can aggregate data from other vehicles traveling in a same area to create a map of events. Such a map can be provided to a service and/or directly to vehicles.

In this way, a method can include vehicles detecting triggering events, and transmitting data related to such events for aggregation and creation of an event map.

Figure 9:
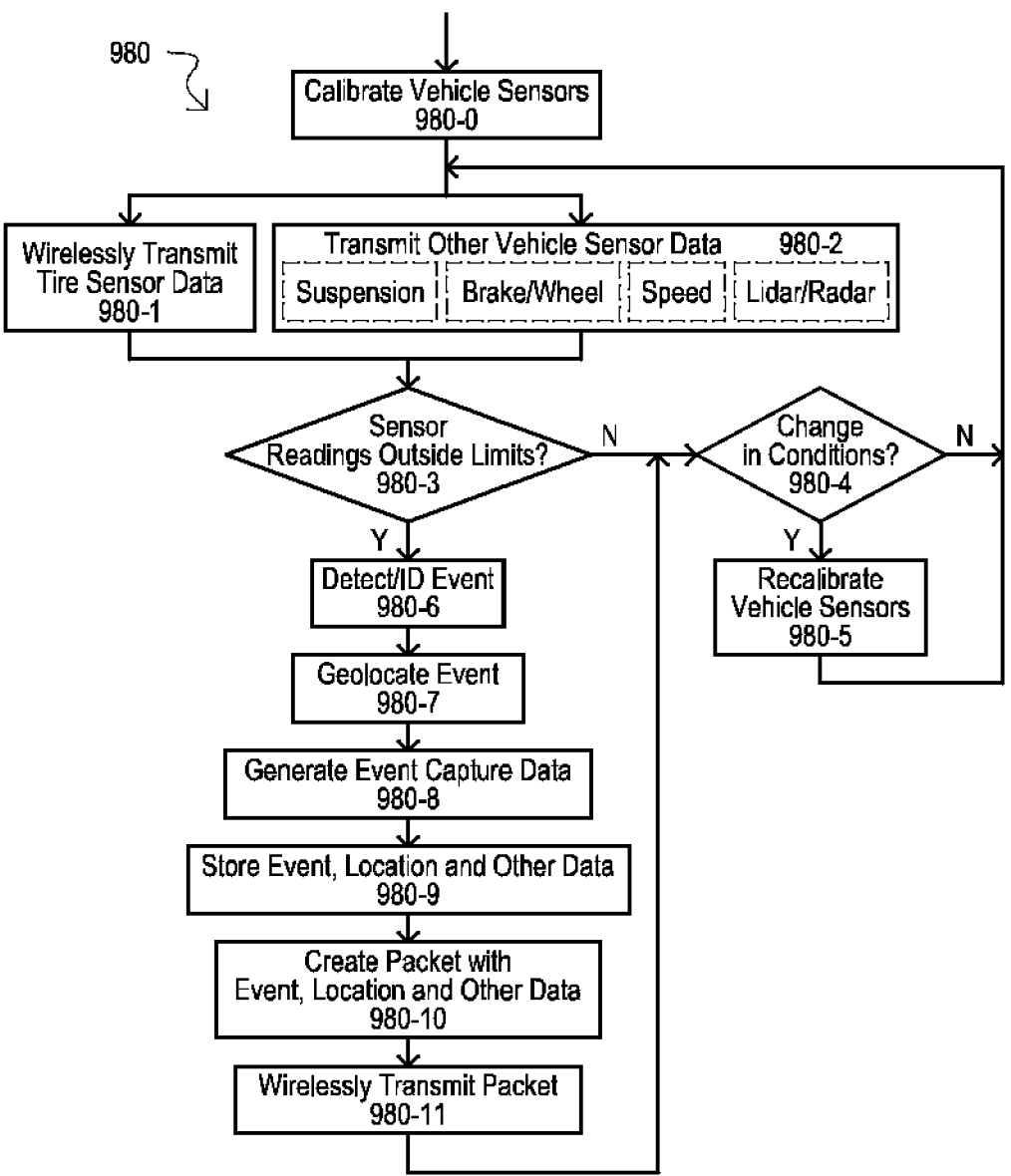
FIG. 9 is a flow diagram of method that can detect vehicle events by comparing sensor values to limits according to embodiments.

FIG. 9 is a flow diagram of another method 980 according to another embodiment. A method 980 can use non-machine learning processing to determine the occurrence of an event. A method 980 can include calibrating vehicle sensors 980-0. Such an action can include those described herein and equivalents.

A method 980 can include wireless transmitting tire sensor data 980-1. Such an action can include any of those described herein, or equivalents. A method 980 can also include transmitting other vehicle sensor data 980-2. Other vehicle sensor can include any other sensors described herein, including but not limited to, suspension sensors, brake and/or wheel sensors, speed sensors and radar and/or lidar.

To determine the occurrence of an event, a method 980 can include determining if sensor readings are outside of limits 980-3. Such an action can include comparing data from one or more sensors to one or more limits. Such sensor data can be raw sensors data or processed sensors data. If no sensor data are out of limits (N from 980-3), a method can include determining if there has been a change in conditions 980-4. Such an action can include any of those described herein and equivalents. If there is no change in conditions (N from 980-4), a method can return to wirelessly transmitting data (980-1/2). If there are changes in conditions (Y from 980-4), a method can recalibrate vehicle sensors based on such conditions 980-5 and return to wirelessly transmitting data (980-1/2).

If sensor readings are outside of one or more limits (Y from 980-3), a method can consider an event detected and identify the event 980-6. Identification of an event can be based on one sensor reading being outside limits, or multiple sensor readings being outside of different limits. A method can geolocate the event 980-7. Such an action can include any of the embodiments described herein and equivalents. Event capture data can be generated 980-8. Such an action can include generating additional data for the event, including but not limited to, a time for the event and other sensor data (e.g., images) related to the event. Event data, location and other data can be stored 980-10.

A method 980 can include creating a packet with event, location and other data 980-10. Such a packet can be wirelessly transmitted 980-11. Such actions can include any of those described herein and equivalents.

In this way, a method can make a determination that an event has occurred based on comparing sensor values to limits. Once an event has been detected, it can be automatically identified, and data for the event can be wirelessly transmitted in a packet.

FIGS. 10A and 10B are flow diagrams of methods 1081 and 1080 according to additional embodiments. Methods 1081/1080 can include machine learning to determine the occurrence of an event using vehicle sensor data.

FIG. 10A shows a training method 1081 according to an embodiment. A training method 1081 can include storing training data that includes vehicle sensor data and corresponding event data 1081-0. A statistical model can then be trained with such training data to generate event data in response to at least the vehicle sensor data 1080-0.

FIG. 10B shows a method 1080 that detects vehicle events with a learned model like that created by the method shown in FIG. 10A. FIG. 10B includes items like those of FIG. 9, and such items are referred to by the same reference characters but with the leading digits being "10" instead of "9".

A method 1080 can differ from that of FIG. 9 in that sensor data can be used as inputs to an AI system to determine the occurrence of an event 1080-12, and the AI system can then determine if an event has occurred 1080-13. In some embodiments, an AI system can also determine the type of event that has occurred.

In this way a method can apply sensor data to an artificial intelligence system to determine if an event has occurred. Once an event has been detected, data for the event can be wirelessly transmitted in a packet.

Figure 11:
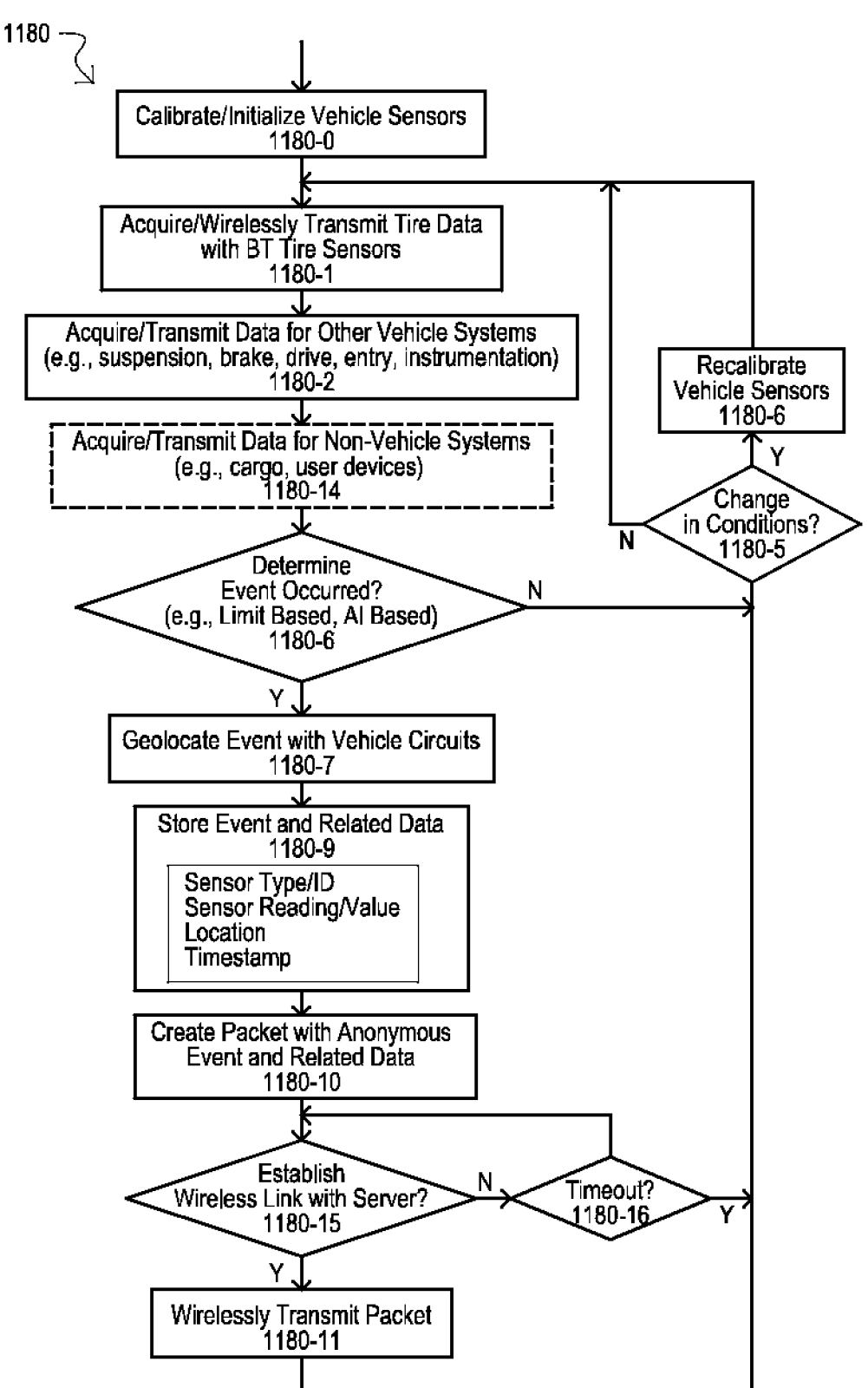
FIG. 11 is a flow diagram of a method according to a further embodiment.

FIG. 11 is a flow diagram of a method 1180 according to another embodiment. A method 1180 can include calibrating and initializing vehicle sensors 1180-0. Tire data can be acquired and wirelessly transmitted with BT tire sensors 1180-1. Data can be acquired and/or transmitted for other vehicle systems 1180-2. Such other vehicle system data can be from any appropriate vehicle system including but not limited to a suspension system, brake system, drive system, entry system or instrumentation.

Optionally, a method 1180 can include acquiring and/or transmitting data from non-vehicle systems 1180-14. Non-vehicle systems can include, but are not limited to cargo and/or passengers carried by the vehicle.

A method 1180 can determine if an event occurred 1180-6. Such an action can include any of those described herein, or equivalents, including limit-based or AI based processing. If it is determined that an event has not occurred (N from 1180-6), a method can determine if conditions have changed 1180-6 1180-4, and recalibrate vehicle sensors if appropriate 1180-5.

If it is determined that an event has occurred (Y from 1180-6), a method can geolocate the event with vehicle circuits 1180-7 and then store event and related data 1180-9. Event and related data can include any such data as described herein, including but not limited to, sensor type/ ID, a sensor reading/value, location and/or timestamp.

In some embodiments, a method 1180 can create a packet with anonymous event and related data 1180-10. Such an action can create a packet that does not include information for identifying a source of the event data, such as the vehicle or sensors used to detect the event. In such an arrangement, a remote computing system can receive event data without receiving information identifying the sending vehicle.

A method 1180 can attempt to establish a link with a server 1180-15. If a link cannot be established within a time period (N from 1180-15, Y from 1180-16), a method can return to 1180-4. If a link can be established (Y from 1180-15), a method can wirelessly transmit the packet 1180-11.

In this way, a method can utilize wireless tire sensor data, and other data to determine if a vehicle road event has occurred, and then transmit an anonymous packet with event data to a remote server.

Figure 12:
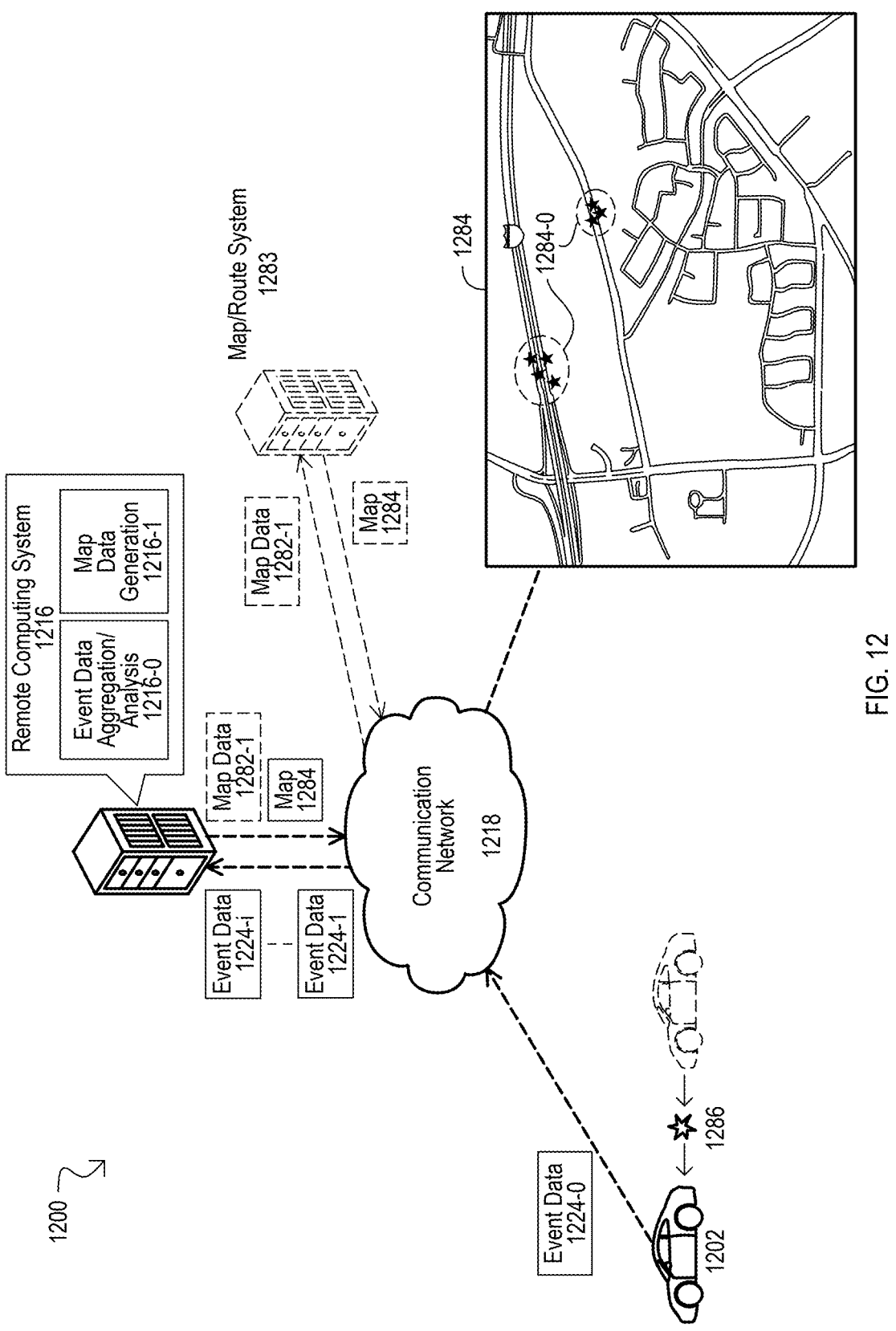
FIG. 12 is a diagram showing a system for generating map data in response to automatic event data reporting according to an embodiment.

FIG. 12 shows a system 1200 according to an embodiment. A system 1200 can include a vehicle system 1202, communications network 1218, remote computing system 1216, and optionally a map/route server 1283. In response to experiencing a road event 1286, a vehicle system 1202 can automatically generate and transmit event data 1224-0 to a remote computing system 1216. Other vehicles can transmit other event data 1224-1 to 1224-I to remote computing system 1216.

In some embodiments, a remote computing system 1216 can include one or more server systems running one or more applications that can aggregate and analyze event data 1216-0 and generate map data 1216-1. Aggregating/analyzing event data 1216-0 can include, but is not limited to, determining the presence of an event, location of an event, and a type of event. Generating map data 1216-1 can include generating a map 1284 that locates events 1284-1, as determined from analyzing event data (1224-0 to 1224-*i*). In some embodiments, a remote computing data system 1216 can generate a map 1284.

In addition or alternatively, a remote computing system 1216 can transmit map data 1282-1 to a route/map system 1283, which can generate a map with events, and transmit such a map to vehicles.

In this way, a vehicle system can detect road events and automatically transmit event data to a remote computing system. A remote computing system can analyze event data and generate map data that can include the locations and type of events.

Embodiments can include methods, devices and systems that can include wirelessly receiving sensor data from at least one vehicle system. By operation of vehicle processing circuits, a vehicle hazard event can be detected using at least the sensor data. In response to detecting the vehicle hazard event, event data for identifying the vehicle hazard event can be generated, time data for the detected vehicle hazard event can be determined, and geographic location data for the detected vehicle hazard event can be determined. By operation of vehicle wireless circuits, an event report can be wirelessly transmitted that includes at least the event data and the geographic location data.

Embodiments can include methods, devices and systems that include processing circuits configured to detect a vehicle hazard event using at least first vehicle sensor data. In response to detecting the vehicle hazard event, processing circuits can generate event data that identifies the vehicle hazard event, determine time data for the detected vehicle hazard event, and determine geographic location data for the detected vehicle hazard event. Wireless circuits can be configured to receive the sensor data from a plurality of vehicle sensors and transmit an event report comprising the event data, the time data and the geographic location data.

Embodiments can include methods, devices and systems that can include first vehicle sensors configured to generate and wirelessly transmit first sensor data indicating a state of a vehicle system. First wireless circuits can be configured to receive the first sensor data. Processing circuits coupled to the first wireless circuits can be configured to receive the first sensor data, detect a vehicle hazard event using at least the first sensor data, and generate an event report that includes event identification data, a time value and a geographic location. Second wireless circuits coupled to the processing circuits can be configured to transmit the event report from the vehicle over a wireless network.

Methods, devices, and systems according to embodiments can include wirelessly receiving the sensor data by receiving sensor communications compatible with at least one Bluetooth standard.

Methods, devices, and systems according to embodiments can include wirelessly receiving tire pressure data from at least one tire sensor.

Methods, devices, and systems according to embodiments can include detecting a vehicle hazard event by applying at least the sensor data values to a statistical model created with machine learning.

Methods, devices, and systems according to embodiments can include determining geographic location data by receiving GPS position data from GPS circuits of the vehicle.

Methods, devices, and systems according to embodiments can include, by operation of vehicle wireless circuits, transmitting a packet compatible with at least one cellular network standard.

Methods, devices, and systems according to embodiments can include, in response to detecting the vehicle hazard event, generating camera data corresponding to the vehicle hazard event data. An event report can include the camera data.

Methods, devices, and systems according to embodiments can include wireless circuits with first wireless circuits compatible with at least one Bluetooth standard and configured to receive the first vehicle sensor data, and second wireless circuits compatible with at least one cellular service standard and configured to transmit an event report.

Methods, devices, and systems according to embodiments can include memory circuits configured to store limit values, and the processor circuits configured to compare the first vehicle sensor data to at least one limit value to detect a vehicle hazard event.

Methods, devices, and systems according to embodiments can include processor circuits having a trained statistical model configured to generate the vehicle hazard event in response to at least first vehicle sensor data.

Methods, devices, and systems according to embodiments can include processing circuits are further configured to generate limit values from at least calibration values for the first vehicle sensors, and compare first sensor data to the limit values. Memory circuits can be configured to store the limit values.

Methods, devices, and systems according to embodiments can include first vehicle sensors configured to generate and wirelessly transmit first sensor data indicating a state of a vehicle system and second vehicle sensors configured to generate second sensor data indicating another state of the vehicle system. A vehicle wired bus system can be coupled to the second sensors and processing circuits, and the processing circuits can detect a vehicle hazard event using at least the first and second sensor data.

Methods, devices, and systems according to embodiments can include additional vehicle sensors can be configured to provide additional sensor data in response to detecting the vehicle hazard. An event report can include the third sensor data.

Methods, devices, and systems according to embodiments can include a server system coupled to a wireless network and configured to add a hazard event to map data in response to at least receiving the event report.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
wirelessly receiving sensor data from at least one vehicle system, including tire pressure data and tire rotation data from at least one tire sensor;
by operation of vehicle processing circuits, detecting road conditions corresponding to a vehicle hazard event using at least the sensor data;
in response to detecting the vehicle hazard event,
generating event data for identifying the vehicle hazard event,
determining time data for the detected vehicle hazard event, and
determining geographic location data for the detected vehicle hazard event; and
by operation of vehicle wireless circuits, wirelessly transmitting an event report comprising at least the event data and the geographic location data.

2. The method of claim 1, wherein wirelessly receiving the sensor data includes receiving sensor communications compatible with at least one Bluetooth standard.

3. The method of claim 1, wherein determining geographic location data comprises receiving global positioning system (GPS) position data from GPS circuits of the vehicle.

4. The method of claim 1, wherein detecting the vehicle hazard event comprises comparing the sensor data to at least one limit.

5. The method of claim 1, wherein detecting the vehicle hazard event comprises applying at least the sensor data values to a statistical model created with machine learning.

6. The method of claim 1, wherein wirelessly transmitting the event report includes, by operation of vehicle wireless circuits, transmitting a packet compatible with at least one cellular network standard.

7. The method of claim 6, further including:
in response to detecting the vehicle hazard event, generating camera data corresponding to the vehicle hazard event data; and
the event report comprises the camera data.

8. A device, comprising:
processing circuits configured to
detect road conditions corresponding to a vehicle hazard event using at least first vehicle sensor data that includes tire pressure data and tire rotation data from at least one tire sensor,
in response to detecting the vehicle hazard event,
generate event data that identifies the vehicle hazard event,
determine time data for the detected vehicle hazard event, and
determine geographic location data for the detected vehicle hazard event; and
wireless circuits configured to receive the sensor data from a plurality of vehicle sensors and transmit an event report comprising the event data, the time data, and the geographic location data.

9. The device of claim 8, wherein:
the wireless circuits comprise
first wireless circuits compatible with at least one Bluetooth standard and configured to receive the first vehicle sensor data, and
second wireless circuits compatible with at least one cellular service standard and configured to transmit the event report.

10. The device of claim 8, further including:
memory circuits configured to store limit values; and
the processor circuits are configured to compare the first vehicle sensor data to at least one limit value to detect the vehicle hazard event.

11. The device of claim 8, wherein the processor circuits comprise a trained statistical model configured to generate the vehicle hazard event in response to at least the first vehicle sensor data.

12. A system, comprising:
first vehicle sensors comprising at least one tire sensor, configured to generate and wirelessly transmit first sensor data indicating a state of a vehicle system, including tire pressure data and tire rotation data;
first wireless circuits configured to receive the first sensor data;
processing circuits coupled to the first wireless circuits and configured to
receive the first sensor data,
detect road conditions corresponding to a vehicle hazard event using at least the first sensor data, and
generate an event report that includes event identification data, a time value, and a geographic location; and
second wireless circuits coupled to the processing circuits and configured to transmit the event report from the vehicle over a wireless network.

13. The system of claim 12, wherein the second wireless circuits are selected from the group of: circuits compatible with at least one cellular communication standard and circuits compatible at least one wireless IEEE 802.11 standard.

14. The system of claim 12, further including:
the processing circuits are further configured to
generate limit values from at least calibration values for the first vehicle sensors, and
compare first sensor data to the limit values; and
memory circuits configured to store the limit values.

15. The system of claim 12, further including:
second vehicle sensors configured to generate second sensor data indicating another state of the vehicle system;
a vehicle wired bus system coupled to the second vehicle sensors and processing circuits; and
the processing circuits detect the vehicle hazard event using at least the first and second sensor data.

16. The system of claim 15, further including:
third vehicle sensors configured to provide third sensor data in response to detecting the vehicle hazard; and
the event report further includes the third sensor data.

17. The system of claim 12, further including a server system coupled to the wireless network and configured to add a hazard event to map data in response to at least receiving the event report.

* * * * *